United States Patent [19]
Hendrick, Jr.

[11] Patent Number: 5,214,292
[45] Date of Patent: May 25, 1993

[54] DYNAMIC INFRARED SCENE DISPLAY

[75] Inventor: Roy W. Hendrick, Jr., Goleta, Calif.

[73] Assignee: Mission Research Corporation, Santa Barbara, Calif.

[21] Appl. No.: 745,601

[22] Filed: Aug. 14, 1991

[51] Int. Cl.⁵ .............................................. G01J 1/00
[52] U.S. Cl. ........................... 250/495.1; 250/504 R; 250/494.1
[58] Field of Search ............... 250/493.1, 494.1, 495.1, 250/504 R; 385/93

[56] References Cited

U.S. PATENT DOCUMENTS

| | | | |
|---|---|---|---|
| 2,983,823 | 5/1961 | Oberly | 250/495.1 |
| 4,295,152 | 10/1981 | Khoe et al. | 385/93 |
| 4,399,453 | 8/1983 | Berg | 385/93 |
| 4,740,259 | 4/1988 | Heinen | 385/93 |

Primary Examiner—Bruce C. Anderson
Attorney, Agent, or Firm—Donald D. Mon

[57] ABSTRACT

An infrared scene display for testing infrared detectors and arrays comprising a two dimensional array of contiguous areas each of which contains an infrared radiating element. A plurality of microlens formed on a substrate are coupled to the array of infrared radiating elements. Each infrared radiating element is sufficiently spread from its associated microlens to provide good thermal insulation but is close enough to operate in an immersion mode. In this configuration, the infrared radiating elements behave optically as though they are in contact with the microlens substrate though they remain thermally isolated.

12 Claims, 2 Drawing Sheets

DYNAMIC INFRARED SCENE DISPLAY

FIELD OF THE INVENTION

This invention relates to an infrared scene display and more particularly relates to a dynamic infrared scene display for use in the development and testing of infrared detecting sensors and focal planes.

BACKGROUND OF THE INVENTION

Infrared emitters are used for development and testing of infrared sensing devices. These infrared emitters can be arranged in an infrared scene display that often comprise a two dimensional array of heated elements. The heated elements emit or radiate infrared radiation. The amount of infrared radiation emitted depends upon the temperature of the infrared emitters. By individually controlling the temperature of each element or emitter in the array a scene of varying brightness in the infrared region can be produced.

An infrared scene display is divided into a two dimensional array of contiguous areas each of which contains a heated infrared radiating element. The shape of the contiguous area can be chosen to cover all of the display and can be any combination of different shapes such as squares, rectangles, triangles, hexagons, etc. The infrared emitting elements must be thoroughly insulated from each other which requires space between the elements. Thus the elements can cover only a fraction of the contiguous area. This fraction is called "fill factor". To achieve a given mean radiance, the smaller the fill factor the hotter the infrared display elements must be. The additional heat load associated with a hot display is undesirable.

It is therefore one object of the present invention to provide an infrared scene array coupling reduced area thermal emitting elements and microlenses to achieve a much enhanced performance infrared scene display.

Yet another object of the present invention is to provide an infrared scene display that has an effective fill factor of substantial unity.

Another object of the present invention is to provide an infrared emitting scene display in a configuration that achieves low power dissipation. A configuration with an effective efficiency of nearly 100 percent allows the temperature of the emitting element to be relatively small.

Still another object of the present invention is to provide an infrared emitting scene display that allows individual element areas to be very small.

Still another object of the present invention is to provide an efficient infrared emitting scene display that is very compact and light weight.

Yet another object of the present invention is to provide an infrared emitting scene display in which the individual element areas are small and have sufficiently large spacings between them to allow for good thermal separation of the elements.

Yet another object of the present invention is to provide an infrared emitting scene display with such very small emitters that their temperatures can be changed quickly. Yet another object of the present invention is to provide an infrared emitting scene display having an integral array of microlenses that can be produced with the use of standard microcircuit technology.

BRIEF DESCRIPTION OF THE INVENTION

The purpose of the present invention is to provide an infrared emitting scene display with a coupling of reduced-area thermal-emitting elements and microlenses which achieves a much enhanced performance compared with the prior art.

An infrared emitting scene according to the invention is divided into a two dimensional array of contiguous areas each of which contains a heated infrared radiating element. The shape of the areas in the two dimensional array can be chosen so they pack together to cover all or nearly all of the display plane. Any combination of differing shapes such as squares, rectangles, triangles, hexagons are suitable. The individual element area with its contained infrared radiating element is referred to as a "dixel". A typical infrared emitting scene display can comprise several hundred rows and columns of dixels each of which is of the order of 50 microns (um) to 100 microns square. Each dixel contains an infrared emitting element and its own small "field" lens called a microlens.

Spacing of the infrared radiating emitter from its microlens is such as to produce an image at a collimator. The collimator may be a lens or a mirror. While the infrared emitting display according to the invention is discussed in terms of use with a collimator, this is for illustrative purposes only, and is not a restriction on the invention nor on its applications. It may be used with other devices, also or instead.

The microlens related to each emitting element is separated from a collimator a distance equal to the focal length of the collimator. The size of the infrared or thermally emitting display is chosen so that its image fills the collimator aperture.

The necessary array of microlenses to be associated with each infrared element may be produced by ion milling or as segmented Fresnel or binary optics lenses using either etching of a substrate or deposition of epitaxial layers using microcircuit technology. Hot press replication may also be used.

The array of microlenses contiguous to each other, each on the order of 50 microns to 100 microns across, is not an array of "thin" lenses. The thickness of the substrate upon which they are constructed will equal or exceed the lens dimensions and consequently the lenses will be designed as "thick" lenses. The heated infrared radiating elements are placed close to but spaced apart from the lens substrate in order to maintain thermal insulation. The radiating element may be fabricated on a separate substrate that is mounted close to the lens array substrate or may be fabricated on the back of the lens substrate which assures alignment.

The performance of the infrared scene display is determined by the spacing between the infrared emitting elements and the substrate. In a preferable but not mandatory configuration the spacing between the infrared radiating elements and the microlenses is small compared to the wavelength of the emitted radiation. For example, if the display is to be viewed at 10 micrometer (10 $\mu$m) wavelength, a spacing of less than 1 micrometer is preferred. In this configuration the infrared radiating element behaves optically as though it were in contact with the substrate but remains thermally isolated. The infrared radiation crosses the empty space as an evanescent wave that penetrates the substrate and continues propagating as an ordinary wave. This mode is designated as an "immersion" mode. Use of the immersion mode allows the use of very small infrared radiating elements and increases the emission per unit area of the elements. Thus the infrared emitting display of the present invention involves the aspects of coupling of the infrared radiating elements to the display plane by microlenses and the use of the immersion mode of operation of the infrared radiating elements. The present invention relates to the use of either aspect individually and preferably of both aspects combined.

The above and other novel features and advantages of the invention will be more fully understood from the following detailed description and the accompanying drawings in which:

DETAILED DESCRIPTION OF THE INVENTION

Figure 1:
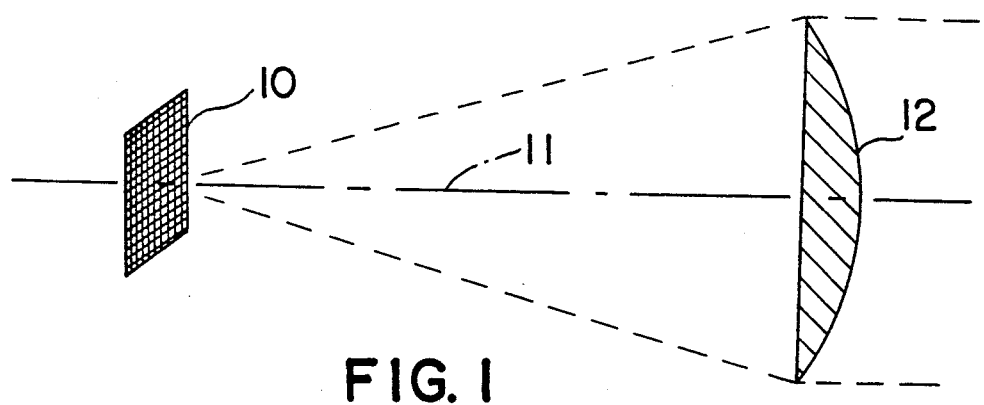
FIG. 1 illustrates generally the arrangement of an infrared emitting scene display with a collimator according to the invention.

A display array disclosed generally in terms of use with a collimator is shown in FIG. 1. While display which is the subject of the present invention is described in terms of its use with a collimator, this is for illustrative purposes only and is not a limitation or restriction on the invention or on its application.

The scene display can be viewed directly by a infrared camera. The display may be placed at the focus of the collimator so that the infrared scene display appears be at a great distance from the sensor, or instead it maybe reimaged onto a focal plane of an infrared sensing array. These examples show the generality of use of this device.

In FIG. 1 an infrared array display 10 and a collimator 12 having a common axis 11 are illustrated. Infrared scene array display 10 is divided into a two dimensional array assemblage of contiguous areas each of which contains one heated radiation element. The shape of the areas in array 10 can be chosen so they pack together to cover substantially all of the display plane. Infrared array display 10 is typically separated from collimator 12 a distance equal to the focal length of the collimator 12 as indicated by FC.

Figure 2:
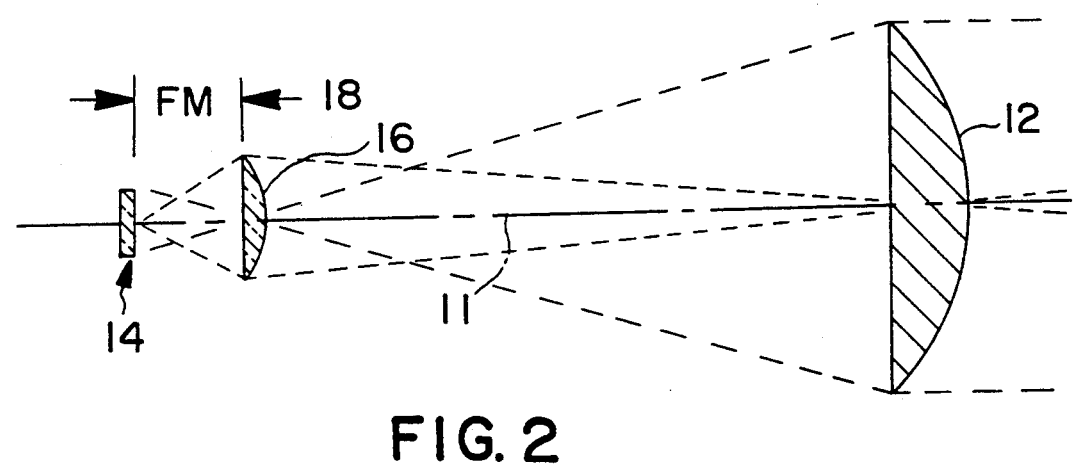
FIG. 2 is a diagrammatic view of one dixel of the display and its related field lens in a microlens coupled infrared emitting display.

The present invention employs a coupling of reduced area thermal emitting elements and microlenses to achieve a much enhanced performance, as illustrated in FIG. 2. Each individual area element of infrared array display 10 with its contained infrared radiating element 14 is referred to as a "dixel". Each dixel contains its own infrared emitting element 14 and also its small "field" microlens 16 at the focal point of collimator 12.

The diagram of FIG. 2 illustrates one dixel of the scene display 10 shown in FIG. 1. The spacing (FM) indicated at 18 of each microlens 16 from its infrared thermal radiating emitter is such as to produce an "image" of the infrared emitter 14 at collimator 12. The collimator may be a lens or a mirror. Microlens 16 itself is separated from collimator 12 a distance equal to the focal length of the collimator as was indicated previously. The size of each infrared thermal emitter 14 is selected so that its image fills the aperture of its respective collimator.

Figure 3:
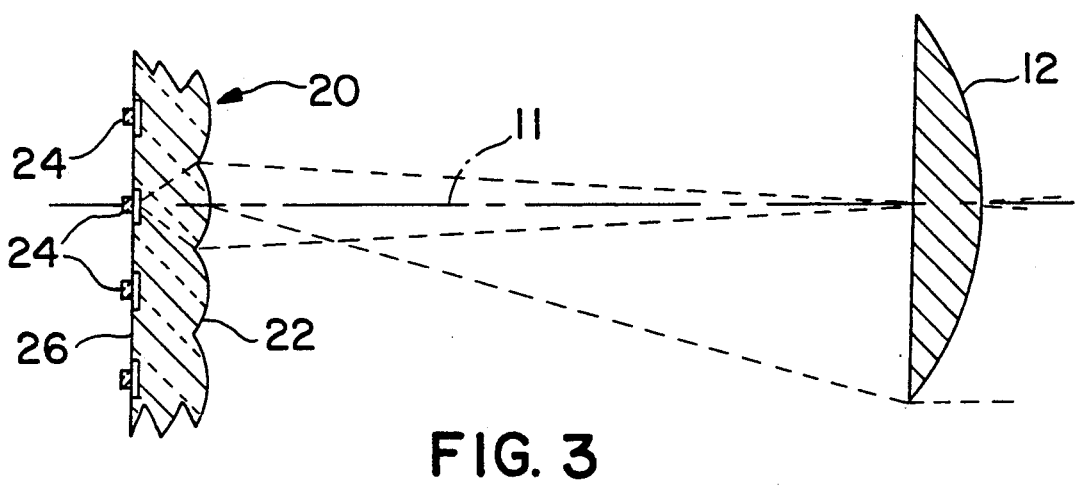
FIG. 3 is a diagrammatic view of a portion of an integrated infrared emitting display.

A portion of infrared emitting array display 10 is illustrated in FIG. 3 in which an array of which thermal emitting infrared elements 24 and a microlens array 20 are coupled in an integrated display. The array of microlenses is constructed on a substrate 22 whose thickness equals or exceeds the lens dimensions, and consequently the lenses are designed as thick lenses. Heated infrared radiating elements 24 are placed close to the back of substrate 22 but not touching each other in order to maintain good thermal insulation. Infrared radiating elements 24 may be fabricated on a separate substrate 26 mounted close to lens array substrate 22 or preferably, as illustrated in FIG. 3, may be fabricated on the back of lens substrate 22 to assure alignment.

The performance of the combination of infrared radiating elements 24 and the array of microlenses 20 depends upon spacing 18 (FIG. 2) between elements 24 and substrate 22. Preferably space 18 is small compared to the wavelength of radiation emitted from infrared elements 24. Thus if the infrared scene display is to be viewed at a 10 micrometer (10 um) wavelength, a spacing of less than one micrometer (1 um) is desirable. At this configuration, radiating elements 24 behave optically as though they were in contact with substrate 22 but they remain thermally isolated. Radiation from infrared emitting elements 24 crosses space 26 as an evanescent wave that penetrates substrate 22 and continues propagating as an ordinary wave. This mode is designated as an "immersion" mode. Use of the immersion mode allows the use of much smaller radiating elements 24 and increases the radiation per unit area of the elements.

Microlens array 20 may be produced by ion milling, hot press replication, or as segmented Fresnel or binary optic lenses using either etching of a substrate or deposition of epitaxial layers using microcircuit technology.

An array of microlenses on the order of 50 micrometers to 100 micrometers across, constructed with lens dimensions that equal or exceed the substrate are produced as thick lenses. The two aspects of the disclosed invention are the coupling of the infrared radiating elements to the display plane by microlenses and the use of the immersion mode operation of the infrared radiating elements 24. Either of these aspects can be used individually or they can be combined in the preferred embodiment.

Figure 4:
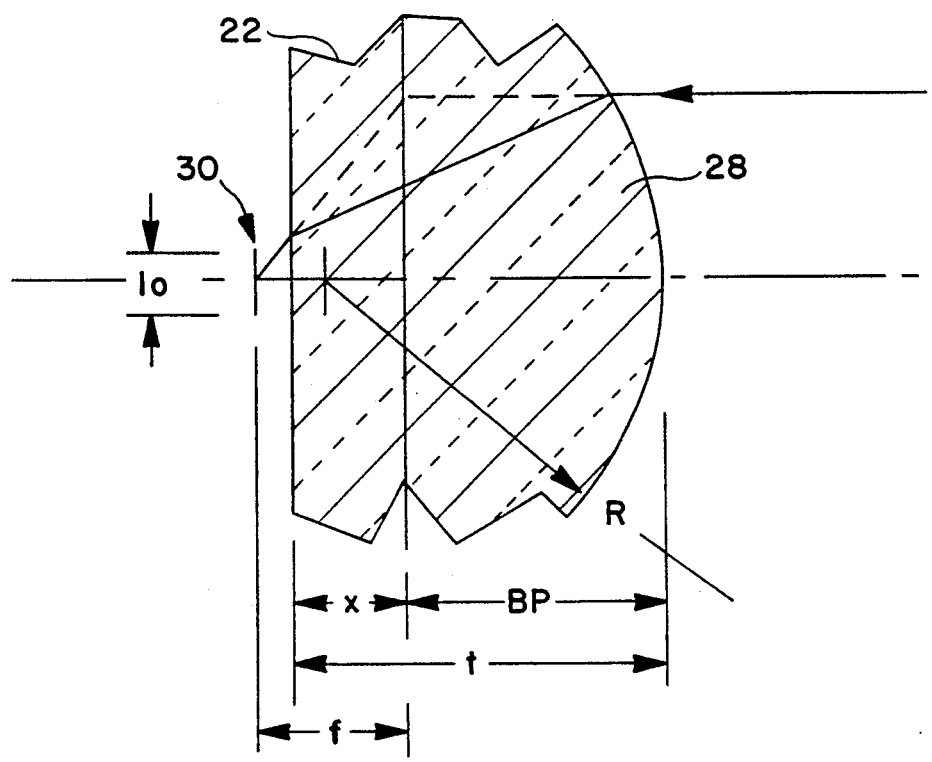
FIG. 4 is a diagram illustrating the optical design parameters of a thick lens array.

Each lens 16 (FIG. 2) in microlens array 22 will be planoconvex with the convex side toward collimator 12 as shown in FIG. 4.

The formula for thick lens leads to the following: focal length:

$$f = \frac{R}{\mu - 1} \quad (1)$$

where
f = focal length (m)
R = radius of lens curvature (m), and
$\mu$ = substrate index of refraction.
Furthermore, if we denote:
t = thickness of the lens substrate (m);
x = separation of emitting element and substrate (m);

$f/m$ = f/number at the emitting element;
$f/c$ = f/number of collimator; and
$l_e$ = length of emitting element (m); and
$Px$ = dixel size (m).

then $$l_e = Px \frac{f/m}{f/c} \quad (2)$$

$$R = (\mu - 1) Px(f/m), \quad (3)$$

and $$t = \mu \left( \frac{Px}{f/m} - x \right). \quad (4)$$

It is assumed that the infra-red emitter is imaged at the aperture of collimator 12. For efficient operation and good beam uniformity, a design using an emission having a cone f-number of about 1 is preferred. Thus, the last three equations (2) through (4) and the appropriate design parameter values for Px, f/c, m and x define the remaining design perameters.

If the value of x is much less than the wavelength of radiation, immersion operation occurs. In this case, the values of le, R, and t are all reduced by the index of refraction of the lens medium.

Thus:

$$l_e = Px \frac{(f/m)}{\mu(f/c)} \quad (5)$$

$$R = \left( \frac{\mu - 1}{\mu} \right) Px(f/m), \quad (6)$$

and $$t = Px(f/m) \quad (7)$$

and the radius, as $$R = \left( \frac{\mu - 1}{\mu} \right) Px(f/m). \quad (8)$$

The above analysis applies exclusively to geometric optics. In many cases physical optics apply. This situation occurs if one wishes to provide test equipment for a sensor or a focal plane such that a single detector matches the diffraction limited spot (or is smaller) and wishes to use two dixels per pixel of the image plane. This is usually desired in order to maintain the high frequency components in the scene without aliasing into the sensor data bandwidth. This is another way of saying that ripple in the projected scene is minimized.

The reduced radiance that results can be partly regained by increasing infrared emitter size beyond that given by equation (2) and (5). This increase also provides a more uniform illumination at the aperture of collimator 12. The remainder of any desired radiance is obtained by increasing the infrared emitter temperature.

Figure 6:
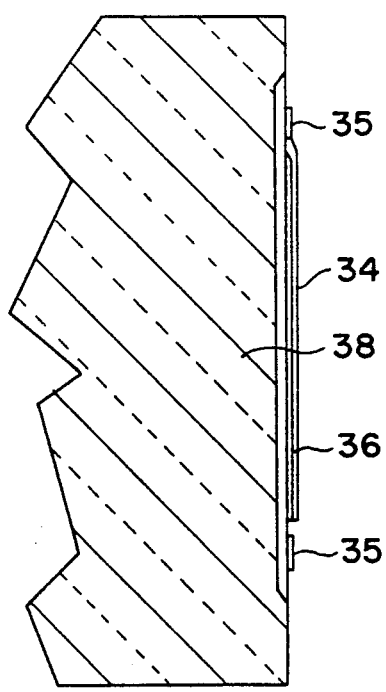
FIG. 6 is a sectional view taken at 6—6 of FIG. 5.
Figure 5:
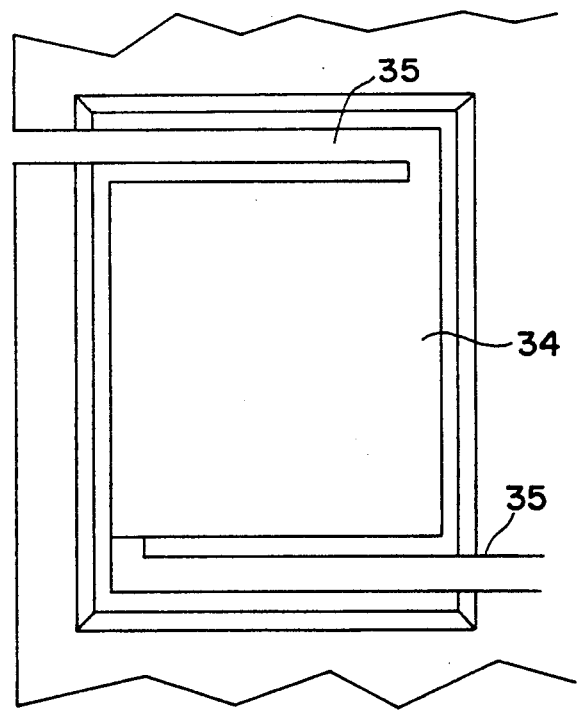
FIG. 5 is a diagram illustrating the method of constructing small thermal emitting elements that are well insulated from the substrate.

Infrared emitter 24 must be close to substrate 22 and yet well insulated thermally from it. FIG. 5 is a diagram illustrating a means to accomplish this. In FIG. 5 and sectional view of FIG. 6, thermal infrared emitter 34 is a thin planar element suspended by arms 35 over a shallow pit 36 produced in the rear surface of a lens substrate 38 which can be selected from the group including but not limited to silicone and germanium. Long thin arms 35 result in a long thermal conduction path. The term "long" in this sense means on the order of ten micrometers if they are only one micrometer wide and 0.1 millimeters thick. This structure can be fabricated by etching pit 36 in substrate 38 and filling it with a relatively soluble material. Infrared emitting element 34 is then deposited on the readily soluble material in pit 36 along with the structural support. The soluble filling material in the pit is then dissolved from under infrared emitter 34.

A variety of methods are suitable to heat the infrared emitters in the infrared scene array display. One method is to fabricate infrared emitting element 34 as shown in FIG. 5 as a pair of layers of dissimilar materials to form a thermal electric junction. Passing an electric current through this junction will release or absorb heat depending on the polarity. Another method would be to fabricate infrared element 34 with a sandwich of a more resistive (electrically) material between conductive layers. An electric current applied to the infrared emitting element can preferentially heat this layer. Optionally metallic serpentines can be provided on an insulating central layer to form a metallic resistive heating element. The infrared element could also be a thin conducting graphitic carbon film between support arms 35 instead of the metallic element. An electric heating current would then be passed through this film.

Infrared emitting element 34 could also be a doped silicone conductor between support arms 35 with an electric heating current applied. Infrared emitting element 34 can also be a film between support arms 35, heated by an electronic beam or a laser.

Thus there has been disclosed an infrared emitting array for testing infrared detectors or sensors. The array display of the invention provides a number of advantages for an infrared thermal emitting display. The display described provides an effective fill factor of unity determined by the fraction of the microlens array that is occupied by the lenses which can be 100 percent or nearly that. Also, the system produces low power dissipation because the configuration is efficient. This allows the individual infrared emitting element temperature to be relative small. For many applications a temperature in the range of 300 degrees K (Kelvin) to 400 degrees K (Kelvin) will be sufficient. This will allow the infrared emitting display to be used inside cryogenic systems and will ease the drain power requirements. The system described also uses very small infrared emitters leaving most of the dixel area available for drive electronics and drive circuits that use only small amounts of power. Thus dixel sizes can be very small. Small dixels and small drive electronics coupled with low power results in a very compact, light weight infrared emitting display array. A 512 by 512 array with its heat sink can be as little as 2.5 centimeters square and weigh as little as 10 grams. Furthermore the spacing of dixels relative to the size of the actual infrared emitting elements used assures good thermal separation of the elements. This means that emission from one emitter will be little effected by adjacent neighbor emitters. Further, the very small size of the required emitters result in small thermal mass. This in turn will result in the capability to change the emitter temperature quickly, thereby providing high frequency response.

This invention is not to be limited by the embodiments shown in the drawings and described in the description which are given by way of example and not of limitation, but only in accordance with the scope of the appended claims.

I claim:

1. An infrared scene display comprising:
   a two dimensional array of miniature infrared radiating elements;
   coupling means coupling the radiation of said two dimensional array of miniature infrared radiating elements to a display plane, said coupling means comprised of a coupling device for each infrared radiation element; and
   spacing means for spacing each infrared radiating element from each coupling device, each of said infrared radiating elements being spaced from said coupling means a preselected distance that is optically equivalent to being in contact while remaining thermally isolated;
   whereby said infrared scene display can be used to test infrared detecting sensors and focal planes.

2. The display according to claim 1 in which said coupling means includes an array of microlenses that are contiguous to each other to fill the display area.

3. The display according to claim 2 in which said array of contiguous microlenses are formed on a substrate having a thickness that is at least equal to each lens dimension.

4. The display according to claim 3 in which said infrared radiating elements are mounted on the back of said substrate forming said array of microlenses.

5. The display according to claim 4 including insulating mens to thermally insulate said infrared radiating elements from said array of contiguous microlenses.

6. The display according to claim 4 in which said infrared radiating elements comprise resistive heating elements.

7. The display according to claim 6 in which said infrared radiating elements comprise a pair of layers of dissimilar materials forming a thermal electric junction.

8. The display according to claim 3 in which each of said lens in said array of contiguous microlenses array is planoconvex.

9. The display according to claim 2 in which the spacing of said infrared radiating elements from said array of contiguous microlenses is selected to produce an immersion mode operation of said infrared radiating elements.

10. The display according to claim 2 in which the spacing of said infrared radiating elements from said array of contiguous microlenses is selected so that the ratio of radiation wavelength to spacing is approximately 10 to 1.

11. The display according to claim 10 in which said spacing of said infrared radiating element from said array of contiguous microlenses is approximately 1 micrometer.

12. The display according to claim 11 in which each lens in said array of contiguous lens is in the range of 50 to 100 micrometers across.

* * * * *